US007233814B2

(12) United States Patent
Wissinger et al.

(10) Patent No.: US 7,233,814 B2
(45) Date of Patent: Jun. 19, 2007

(54) COMMUNICATION SYSTEM FOR VEHICLE MANAGEMENT

(75) Inventors: Wayne Ellsworth Wissinger, Greencastle, PA (US); Isidoros Nikolaos Skarlis, Bethlehem, PA (US); P. Bruce Mochrie, Whitehall, PA (US)

(73) Assignee: Mack Trucks, Inc., Allentown, PA (US)

( * ) Notice: Subject to any disclaimer, the term of this patent is extended or adjusted under 35 U.S.C. 154(b) by 208 days.

(21) Appl. No.: 10/754,627

(22) Filed: Jan. 12, 2004

(65) Prior Publication Data

US 2004/0157650 A1 Aug. 12, 2004

Related U.S. Application Data

(60) Provisional application No. 60/439,793, filed on Jan. 14, 2003.

(51) Int. Cl.
*H04B 1/38* (2006.01)

(52) U.S. Cl. ...................... 455/569.2; 455/466; 701/29

(58) Field of Classification Search ................ 455/466, 455/99, 557, 569.2; 701/29; 709/237
See application file for complete search history.

(56) References Cited

U.S. PATENT DOCUMENTS 6,154,658 A * 11/2000 Caci ........................... 455/466
2002/0184385 A1* 12/2002 Kato .......................... 709/237
2005/0085963 A1* 4/2005 Kapolka et al. .............. 701/29

* cited by examiner

*Primary Examiner*—Joseph Feild
*Assistant Examiner*—Phuoc Doan
(74) *Attorney, Agent, or Firm*—Martin Farrell

(57) ABSTRACT

A communication system for vehicle management includes a vehicle, a vehicle management system disposed in the vehicle outputting first data to control substantially a function of the vehicle and recording second data substantially analogous to an operating parameter of the vehicle, a base station substantially remote from the vehicle and having a second transceiver, a first transceiver disposed in the vehicle and connected communicably to the vehicle management system to receive third data from the second transceiver and send the second data to the second transceiver, the third data updating the vehicle management system.

10 Claims, 2 Drawing Sheets

COMMUNICATION SYSTEM FOR VEHICLE MANAGEMENT

CROSS-REFERENCE TO RELATED APPLICATIONS

This application claims priority to Provisional Application Ser. No. 60/439,793, filed Jan. 14, 2003, the disclosure of which is incorporated by reference.

BACKGROUND OF THE INVENTION

1. Field of the Invention

The invention relates to communication systems for vehicle management, and in particular, to wireless data modems in vehicles.

2. Description of the Related Art

Vehicles, such as over-the-road trucks, are often operated in fleets. Such vehicles may be equipped with computerized controls for their engines or transmissions. These controls may control various operating parameters, such as fuel flow and exhaust gas recirculation. These controls may collect information about vehicle operation as well. All vehicles of a particular type in a fleet may be equipped similarly. Owners or managers of such fleets may desire information about the operating status of each individual member of the fleet in order to manage the fleet efficiently. Since a vehicle such as an over-the-road truck may be away from a base of operations for a considerable periods of time it may be difficult to maintain information that is current. It may also be difficult to schedule the vehicle for maintenance to the control system, such as software upgrades, that entail bringing the vehicle back into a shop.

SUMMARY OF THE INVENTION

In several aspects, the invention may provide a wireless data modem for a vehicle. In particular, in a first aspect, a communication system for vehicle management may include a vehicle, a vehicle management system disposed in the vehicle, the vehicle management system outputting first data to control substantially a function of the vehicle and recording second data substantially analogous to an operating parameter of the vehicle, a base station substantially remote from the vehicle and having a second transceiver, a first transceiver disposed in the vehicle and connected communicably to the vehicle management system to receive third data from the second transceiver and send the second data to the second transceiver, the third data updating the vehicle management system.

In a second aspect, a method of communication for a vehicle management system may include outputting first data from a vehicle management system to control substantially a function of a vehicle, recording second data substantially analogous to an operating parameter of the vehicle, sending the second data to a base station substantially remote from the vehicle, receiving third data from the base station, and updating the vehicle management system with the third data.

In a third aspect, a system for communication for a vehicle management system may include means for outputting first data from a vehicle management system to control substantially a function of a vehicle, means for recording second data substantially analogous to an operating parameter of the vehicle, means for sending the second data to a base station substantially remote from the vehicle, means for receiving third data from the base station, and means for updating the vehicle management system with the third data.

DETAILED DESCRIPTION OF THE PREFERRED EMBODIMENTS

Owners or managers of fleets of vehicles may be interested in keeping track of their vehicles while the vehicles are in the field. It would be desirable to be able to access information about a vehicle's use, location, or condition from a remote station. It would further be desirable to be able to fill in driver's log books automatically, with little or no driver input. A vehicle's software may need to be upgraded while the vehicle is in the field. It would be desirable to be able to send a vehicle updates for its software at a remote location, thus dispensing with a necessity of bringing the vehicle into a shop. A driver of a vehicle may not be interested or qualified to upgrade software. It would be desirable if software could be upgraded automatically from the remote location, with little or no driver input. Sometimes vehicles are stolen or otherwise used in an unauthorized manner. It would be desirable for the vehicle to be disabled safely from a remote location.

Figure 1:
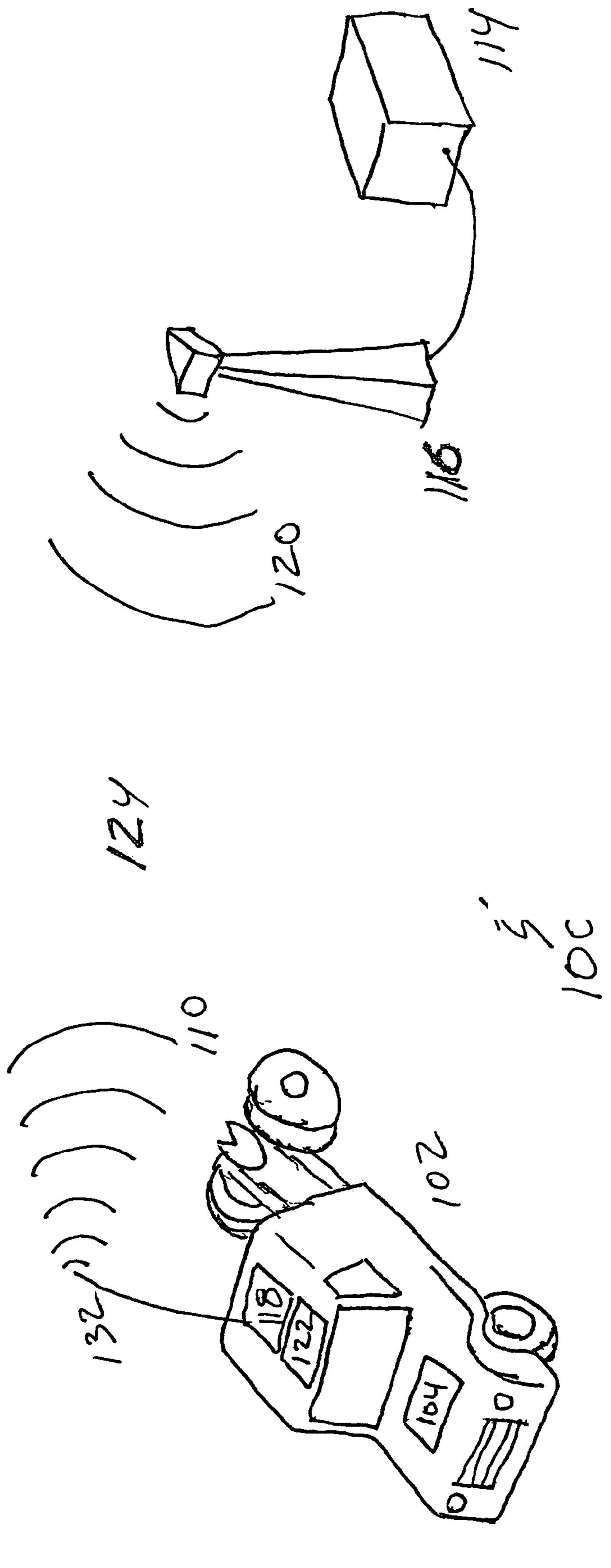
FIG. 1 is a communication system for vehicle management according to a first embodiment of the invention.

In FIG. 1 is shown a communication system 100 for vehicle management according to a first embodiment of the invention. Communication system 100 may include a vehicle management system 104 disposed in a vehicle 102. In several embodiments, vehicle management system 104 may include an engine control unit, a transmission control unit, a powertrain control unit, or a vehicle control unit.

Figure 2:
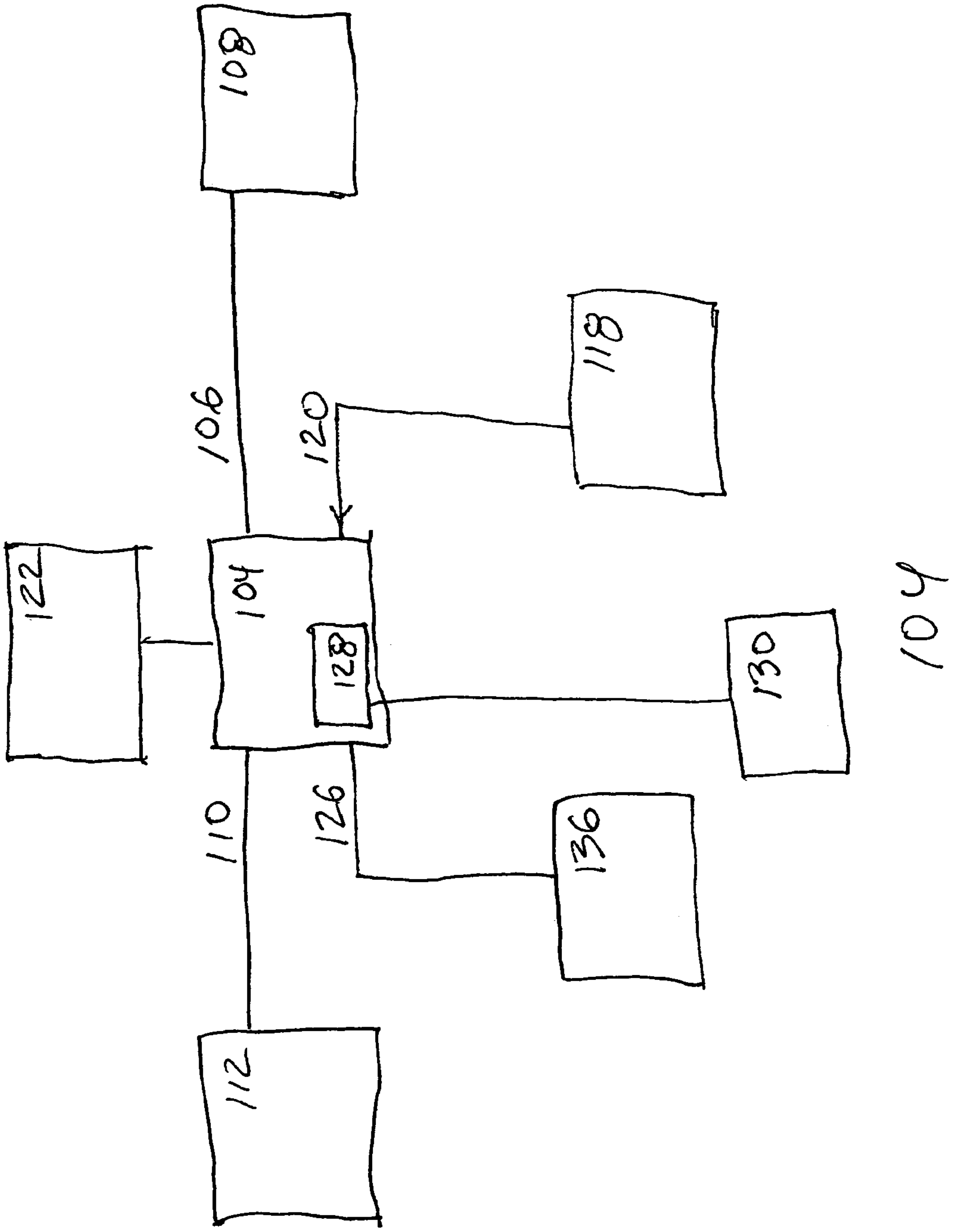
FIG. 2 is a vehicle management system for use with an embodiment of the invention.

In FIG. 2 is shown a schematic of vehicle management system 104. Vehicle management system 104 may output first data 106 to control substantially a function 108 of vehicle 102. In several embodiments, vehicle function 108 may be a rate or volume of exhaust gas recirculation (EGR), fuel injection, air flow, turbo-charger boost, or a valve timing, a governor speed, or a brake application.

Vehicle management system 104 may further record second data 110 substantially analogous to an operating parameter 112 of vehicle 102. In several embodiments, vehicle operating parameter 112 may be a duration of engine operation, a distance traveled, an engine speed, a vehicle speed, a wheel speed, a vehicle location, a barometric pressure, a fuel consumption, a diagnostic code, an oil temperature, an air temperature, a coolant temperature, a brake temperature, a tractive effort, a brake pad thickness, or a tire pressure.

In several embodiments, vehicle management system 104 may record second data 110 pertaining to duration of engine operation, diagnostic codes, brake pad thickness, or tire pressure in order to schedule maintenance, such as lubricant changes or overhauls. Second data 110 pertaining to distance traveled and fuel consumption may be collected to assess the efficiency at which a vehicle is used, such as a fuel efficiency or an up-time, and or used to schedule maintenance. Second data 110 pertaining to distance traveled may be used to fill out a driver's log book automatically. Second data 110 pertaining to engine speed may be collected to assess the severity of an engine's duty.

In one embodiment, vehicle management system 104 may record second data 110 pertaining to wheel speed to track wheel slip and tire pressures. A flat tire, for example, has to rotate faster than the same tire did when it was inflated since its radius is now smaller. Second data 110 pertaining to vehicle speed may be collected to ensure drivers of the vehicle are conforming to speed regulations.

In one embodiment, vehicle management system 104 may record second data 110 pertaining to vehicle location to manage a fleet, such as by scheduling pickups to be made by vehicle 102 nearest, a location of a load, or to download software for the control system that is appropriate for a particular location. A particular set of engine control parameters that were optimum when a vehicle was traveling across the Mojave desert in August could be replaced with a new set of operating parameters if the vehicle has since traveled to Yellowknife in December. A vehicle 102 operating in cold weather or at high altitudes, for example, may need less EGR to stay within emissions standards. The control parameters could be updated to reflect that need.

Similarly, vehicle management system 104 may record second data 110 pertaining to barometric pressure, oil temperature, air temperature, coolant temperature, brake temperature or tractive effort to assess the conditions under which a vehicle is operating, and to download software for the control system that is appropriate for that set of operating conditions.

In one embodiment, communication system 100 may include a base station 114 as shown in FIG. 1, such as an off-board server like an IEEE 802.11b or a Wireless Local Area Network (WLAN) server. Base station 114 may be substantially remote from vehicle 102 and have a second transceiver 116.

In one embodiment, a first transceiver 118 may be disposed in vehicle 102 and connected communicably to vehicle management system 104. In one embodiment, first transceiver 118 may receive third data 120 from second transceiver 116 and send second data 110 to second transceiver 116. In one embodiment, communication between first transceiver 118 and base station 114 may be initiated by base station 114.

In one embodiment, third data 120 may update vehicle management system 104. In several embodiments, third data 120 may be a wake-up signal, a vehicle disabling signal, a data-base update, a software update, a firmware update, an operating system update, or a communication signal. A wake-up signal could be used to power up vehicle management system 104 from base station 114 in order to download a software upgrade or to change an operating parameter of a control system. A vehicle disabling signal could be used in the event the vehicle was stolen or was being otherwise used in an unauthorized manner. A database of operating parameters, software, firmware could be downloaded to vehicle management system 104, or an operating system could be updated, without bringing vehicle 102 back into the shop. A communication signal could be used to communicate with the driver, or to bring information about the activities or the status of vehicle 102 to the driver's attention.

In several embodiments, a channel 124 over which second transceiver 116 communicates with first transceiver 118 may be a wireless channel, a cellular phone channel, a satellite link, a Society of Automotive Engineers (SAE) J1708/J1587 channel, a radio channel, a microwave channel, or an Institute of Electrical and Electronics Engineers (IEEE) 802.11b channel. In one embodiment, a portion of channel 124 may be a hardwired channel, such as a coaxial cable running from base station 114 to a repeater. In another embodiment, base station 114 may be associated with a Wide Area Network (WAN), a portion of which may be hardwired. In several embodiments, data transfer over channel 124 may be done by Satellite data upload via a Qualcomm® system, or a wired data upload via a six pin in-cab diagnostic connector.

In one embodiment, first transceiver 118 may be a short range radio frequency (RF) wireless data modem (SR-WDM). In this embodiment, channel 124 may consist of a bidirectional wireless transfer of data between an electronic system of vehicle 102, such as vehicle management system 104, and base station 114. In one embodiment, the wireless transfer method may be a RF based digital system. In one embodiment, a protocol such as IEEE 802.11b may be used.

Wireless data transfer may require the smooth operation of several systems such as a Vehicle Electronic Control Unit (VECU), an Engine Electronic Control Unit (EECU), a power distribution system of vehicle 102, vehicle management system 104, an antenna system of communication system 100, base station 114, an off-board WAN server, or a final data base/messaging server.

In one embodiment, communication system 100 may be part of a serial data network architecture that may include vehicle management system 104. These systems may share data, interact on a functional basis and potentially share common electronic hardware for the purpose of controlling an electronic system of vehicle 102.

In one embodiment, a portion of communication system 100 resident on vehicle 102 may be powered from an electrical system of vehicle 102. In several embodiments, the electrical system may be a 12 volt (V) or a 24 V electrical system. In one embodiment, communication system 100 may be powered by a 12 volt direct current (VDC) electrical bus of vehicle 102. In this embodiment, communication system 100 may generate internally any other voltages or currents required for its functionality. In one embodiment, communication system 100 may be powered by an ignition key switched power bus of vehicle 102. In this embodiment, communication system 100 may be compatible with a switched type of power source.

In one embodiment, the power may be removed from communication system 100 when temperatures exceed a maximum operating temperature. In one embodiment, this function may be implemented via a temperature control circuit within communication system 100.

In one embodiment, vehicle management system 104 may interface with an on-board data bus 126 of vehicle 102. Data bus 126 may be the medium by which data is transferred between the on-board electronic control units 136 and vehicle management system 104. In one embodiment, data transfer on data bus 126 may be supported over an SAE J1708/J1587 format link. In another embodiment, communication system 100 may also include a Controller Area Network (CAN) bus hardware interface for SAE J1939 format, which is a higher speed control bus that may operate in noisy electrical environments with a high level of data integrity. In one embodiment, SAE J1939 format may also be used for data transfer.

In one embodiment, communication system 100 may be compatible with an SAE J1708/J1587 format. In this embodiment, data bus 126 may contain information useful in servicing vehicle 102 as well as optimizing a performance of a fleet to which vehicle 102 belongs.

In one embodiment, communication system 100 may support off-board RF based wireless communications using Dynamic Host Configuration Protocol (DHCP). In one embodiment, off-board communications may be via an integrated IEEE 802.11b data transceiver.

In one embodiment, communication system 100 may be capable of being upgraded to a newer version of first transceiver 118 without a substantial redesign of the unit. Data transmission may be used for uploading information for vehicle diagnostics and maintenance and data reception for downloading of new settings for adjustable parameters in a depot environment.

In one embodiment, communication system 100 may include an antenna 132. Antenna 132 may be mounted externally to improve system performance. In this embodiment, antenna 132 may be connected to communication system 100 via a Bayonet Nut Connector (BNC) connector.

In one embodiment, vehicle manage system 104 may include a computer subsystem 128. In one embodiment, computer subsystem 128 may be a microprocessor based computer subsystem 128. In this embodiment, the selected microprocessor may have sufficient throughput to perform communication system 100 applications. In this embodiment, computer subsystem 128 may include enough static and dynamic memory storage to support the applications or other requirements of communication system 100.

Computer subsystem 128 may perform power-up or periodic background built-in-self-test (BIST) checks of hardware 130 that may be part of communication system 100. In certain cases a BIST check may not result in a data bus 126 fault message if a serious fault is found. In this embodiment, system checks of communication system 100 may be initiated and validated via communications with the base station 114.

In one embodiment, base station 114 may periodically verify an integrity of communication system 100. This may include verification of access to on-board data bus 126, correct performance of first transceiver 118, or access to off-board data servers. The scheduling of these checks may be adjustable via software running on base station 114.

In one embodiment, communication system 100 may power up vehicle management system 104 after the vehicle's power bus has been switched off. In this embodiment, vehicle management system 104 may be able to shut itself down remotely after a user programmable duration of time, or as commanded to shut itself down by an RF signal from base station 114. In this embodiment, the time duration may be between about one hour and 24 hours, during which time vehicle management system 104 may not consume enough power to impact significantly vehicle battery power.

In one embodiment, communication system 100 may also include a Global Positioning System (GPS) receiver 122. In this embodiment, GPS receiver 122 may be mounted either internally or externally. If mounted internally, GPS receiver 122 may be powered by communication system 100, include a GPS antenna input, and be capable of transmitting GPS information in a programmable time interval on data bus 126. If an external GPS receiver 122 is used, communication system 100 may include provisions to connect to GPS receiver 122 for the purpose of transmitting GPS information across either a serial line or an RF interface.

In one embodiment, communication system 100 may support wireless data transfer applications. In one embodiment, communication system 100 system may simulate a wireless SAE J1587 link between base station 114 and a data bus 126 of vehicle 102. In one embodiment, communication system 100 may have a limited amount of software on vehicle management system 104, with the majority of the software be "web" resident on base station 114. This may be the case if on-board complexity is to be minimized. In one embodiment, communication system 100 may be a "thin client"

In one embodiment, communication system 100 may acknowledge the receipt of a message from an on-vehicle electronic control unit (ECU). In this embodiment, communication system 100 may transfer a SAE J1587 message over an IEEE 802.11b WLAN to base station 114. This type of data transfer may be typical of a DataMax information upload from the on-vehicle VECU to an InfoMax application running on an off-vehicle computer.

In one embodiment, communication system 100 may accept a "wrapped" SAE J1587 message from base station 114, "unwrap" it, and broadcast the message onto data bus 126. This type of data transfer may be typical of an Info Max or a Customer Data Programming (CDP) download of new settings for customer or fleet parameters.

In one embodiment, communication system 100 may respond to a request from base station 114 to connect it to the vehicle's SAE J1708/J1587 network. In this embodiment, initiation of an on-vehicle bus to an IEEE 802.11b WLAN link may be under the control of base station 114.

In one embodiment, computer subsystem 128 may include the necessary firmware and software to accept certain coded messages which may enable serial data packets to be uploaded without non-relevant SAE J1587 "chatter", for the purpose of reducing data transfer times.

In one embodiment, the portion of communication system 100 resident on vehicle 102 may be mounted within a cab of vehicle 102, such as under a dashboard. In this embodiment, communication system 100 electronics may be housed in a single enclosure. This enclosure may provide a means for attachment to the vehicle. In one embodiment, the unit may be mounted to the vehicle using 3M Dual Lock Reclosable Fasteners.

In a second embodiment, a method of communication for a vehicle management system 104 may include outputting first data 106 from vehicle management system 104 to control substantially function 108 of vehicle 102, recording second data 110 substantially analogous to operating parameter 112 of vehicle 102, sending second data 110 to base station 114 substantially remote from vehicle 102, receiving third data 120 from base station 114, and updating vehicle management system 104 with third data 120. In one embodiment, the method of communication for vehicle management system 104 may include waking up vehicle management system 104 with third data 120.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A communication system for vehicle management comprising:

a vehicle;

a vehicle management system disposed in said vehicle, said vehicle management system outputting first data to control substantially a function of said vehicle and recording second data substantially analogous to an operating parameter of said vehicle;

a base station substantially remote from said vehicle and having a second transceiver;

a first transceiver disposed in said vehicle and connected communicably to said vehicle management system to receive third data from said second transceiver and send said second data to said second transceiver, said third data comprising a wakeup signal, a software update, a firmware update and/or an operating system update.

2. The communication system for vehicle management of claim 1, wherein said vehicle function is selected from the group consisting of:
- an EGR,
- a rate of fuel injection,
- a rate of air flow,
- a turbo-charger boost,
- a valve timing,
- a governor speed, and
- a brake application.

3. The communication system for vehicle management of claim 1, wherein said vehicle operating parameter is selected from the group consisting of:
- a duration of engine operation,
- a distance traveled,
- an engine speed,
- a vehicle speed,
- a wheel speed,
- a vehicle location,
- a barometric pressure,
- a fuel consumption,
- a diagnostic code,
- an oil temperature,
- an air temperature,
- a coolant temperature,
- a brake temperature,
- a tractive effort,
- a brake pad thickness, and
- a tire pressure.

4. The communication system for vehicle management of claim 1, wherein, the vehicle management is configured such that if the vehicle management system is not powered up when said third data includes said wakeup signal, the vehicle management system automatically powers up in response to said wakeup signal being received by the first transceiver.

5. The communication system for vehicle management of claim 1, wherein said vehicle management system is selected from the group consisting of: an engine control unit,
- an transmission control unit,
- an powertrain control unit, and
- a vehicle control unit.

6. The communication system for vehicle management of claim 1, comprising further a GPS receiver.

7. The communication system for vehicle management of claim 1, wherein said second transceiver is connected communicably to said first transceiver over a channel selected from the group consisting of:
- a wireless channel,
- a cellular phone channel,
- a satellite link, a SAE J1708/J1587 channel,
- a radio channel,
- a microwave channel, and
- an IEEE 802.11 b channel.

8. A method of communication for a vehicle management system comprising:
- outputting first data from a vehicle management system to control substantially a function of a vehicle;
- recording second data substantially analogous to an operating parameter of said vehicle;
- sending said second data to a base station substantially remote from said vehicle;
- receiving third data from said base station; and
- updating said vehicle management system with said third data, wherein said third data comprises a software update, a firmware update and/or an operating system update.

9. The method of communication for a vehicle management system of claim 8, comprising further: waking up the vehicle management system with said third data.

10. A system for communication for a vehicle management system comprising:
- means for outputting first data from a vehicle management system to control substantially a function of a vehicle;
- means for recording second data substantially analogous to an operating parameter of said vehicle;
- means for sending said second data to a base station substantially remote from said vehicle;
- means for receiving a wakeup signal from said base station; and
- means for powering up the vehicle management system in response to the receiving means receiving the wakeup signal.

* * * * *